United States Patent [19]

Alley et al.

[11] Patent Number: 4,847,095

[45] Date of Patent: Jul. 11, 1989

[54] METHOD FOR FREE CHOICE HORSE FEEDING

[75] Inventors: W. Larnce Alley; Johnie T. Scott, both of Temple, Tex.

[73] Assignee: Wendland's Farm Products, Inc., Temple, Tex.

[21] Appl. No.: 95,829

[22] Filed: Sep. 11, 1987

[51] Int. Cl.⁴ .................................................. A23K 1/00
[52] U.S. Cl. ........................................ 426/2; 426/74; 426/623; 426/630; 426/636; 426/807
[58] Field of Search ................. 426/2, 72, 74, 623, 426/636, 807, 630

[56] References Cited

U.S. PATENT DOCUMENTS

| | | | |
|---|---|---|---|
| 3,946,115 | 3/1976 | Brever | 426/72 |
| 3,984,572 | 10/1976 | Sakaki et al. | |
| 4,138,498 | 2/1979 | Das | |
| 4,197,320 | 4/1980 | Betz et al. | 426/807 |
| 4,234,604 | 11/1980 | Betz et al. | |
| 4,338,336 | 7/1982 | Glabe et al. | |

OTHER PUBLICATIONS

Morrison, "Feeds and Feeding", The Morrison Publishing Co. (1957), pp. 20–21, 27, 824–827, 831–832, 840 & 1091–1092.

*Primary Examiner*—R. B. Penland
*Attorney, Agent, or Firm*—David H. Judson

[57] ABSTRACT

An extruded feed intake limiting composition for use in free choice horse feeding also prevents colic, and founder and other digestive disorders. The horse ration, which has a low-to-medium energy content, is carefully balanced nutritionally as to nutrient density, soluble carbohydrate and fiber content. The ration can be fed to a horse on an ad libitum basis as the sole source of nutrition for the horse excluding water.

3 Claims, No Drawings

METHOD FOR FREE CHOICE HORSE FEEDING

TECHNICAL FIELD

The present invention relates generally to horse feeding and more particularly to a method for unrestricted horse feeding using a low-to-medium energy, bulky, extruded feed intake limiting composition.

BACKGROUND OF THE INVENTION

A horse is generally feed-restricted or hand-fed at least twice per day due to its small stomach size relative to its large body mass. Feeding a horse in an unrestricted or "ad libitum" fashion often results in colic, founder, azoturia and other digestive related problems. To avoid such problems, even complete horse rations containing roughage must be carefully hand-fed. Manual feeding is often time consuming and costly, especially for owners of pleasure horses.

It is known in the prior art to produce horse feeds for high performance horses which have compositions exhibiting good palatability, improved digestibility and high carbohydrate content for increased energy. Such feeds are described in U.S. Pat. No. 3,946,115 to Brever et al, and U.S. Pat. Nos. 4,166,867 and 4,197,320 to Betz et al. These patents, however, generally describe rations which are designed merely to supplement an existing diet; they are not suitable for use in "free choice" or ad libitum feeding. Moreover, while feed intake limiting compositions have been described for ruminants, e.g., in U.S. Pat. Nos. 4,197,319 and 4,230,736 to Betz et al, such compositions are merely dietary supplements which cannot be used for horses. This is because the ruminant digestive system differs substantially from the equine digestive system. Moreover, such ruminant compositions typically restrict feeding through ingredient excess or chemical additives, and these techniques cannot be safely applied to horses.

There is therefore a need for a feed intake limiting composition for use in ad libitum horse feeding which prevents colic, founder and other digestive disorders and which may be fed as a substantially complete ration without supplementation.

BRIEF SUMMARY OF THE INVENTION

The present invention describes an improved extruded feed intake limiting composition for use in unrestricted or "free choice" feeding of a horse having low-to-medium energy requirements. The extruded horse ration is designed to be a complete ration except for water and the ration is nutritionally balanced as to nutrient density, soluble carbohydrate and fiber content.

In a preferred embodiment, a method for free choice horse feeding comprises the steps of extruding a horse ration having a predetermined composition and then feeding the extruded horse ration in an unrestricted manner as a substantially complete equine diet. The extruded horse ration comprises between about 15.0 and 28.0 percent by weight grain with fat and oil products, between about 20.0 and 30.0 percent by weight milling by-products, between about 8.0 and 20.0 percent by weight forage products, between about 8.0 and 20.0 percent by weight roughage products, between about 5.0 and 34.0 percent by weight plant protein products, between about 0.9 and 1.9 percent by weight calcium carbonate, between about 0.4 and 2.0 percent by weight salt, and between 1.7 and 5.0 percent by weight micro-nutrients.

DETAILED DESCRIPTION

A primary apetite control center for a horse is stomach expansion. Once the horse's stomach has become full, its apetite is typically depressed. According to the preferred embodiment of the present invention, a low-to-medium energy, bulky, extruded horse feed ration is fed free-choice to a horse to restrict the horse's overall nutrient intake. Such restriction is the result of actual physical constraints of the horse's stomach capacity. The bulkiness of the extruded horse feed allows for minimum intake of ration each time the horse feeds.

The extruded horse feed of the invention functions to extend or expand the horse's stomach before an excess amount of nutrients is consumed. Although extrusion normally serves to increase the digestible soluble carbohydrate portion of the ration which could otherwise cause founder if rapidly ingested into the horse's bloodstream, the preferred horse ration composition is carefully balanced nutritionally as to nutrient density, soluble carbohydrate, ADF (acid detergent fiber) and NDF (nuetral detergent fiber) so as to prevent such an occurrence. This is accomplished by balancing energy and fiber content of the extruded horse ration primarily by using select grain and grain by-product sources to maintain a balance of soluble carbohydrates. The extruded horse ration preferably has the following generic composition:

TABLE I

| Ingredient | Approximate Percentage By Weight |
| --- | --- |
| Grain Products (with Oil and Fat Products) | 15.0 to 28.1 |
| Grain By-Products | 20.0 to 30.0 |
| Forage Products | 8.0 to 20.0 |
| Roughage Products | 8.0 to 20.0 |
| Plant Protein Products | 5.0 to 34.0 |
| Calcium Carbonate | 0.9 to 1.9 |
| Salt | 0.4 to 2.0 |
| Micro-Nutrient Premix | 1.7 to 5.0 |

The extruded horse feed ration produced according to the above generic composition enables the horse to be fed on an ad libitum basis as substantially the sole source of nutrition for the animal excluding water. Despite such unrestricted feeding, it has been found that the horse has no danger of colic, founder or any other digestive disorders normally associated with horse feed when careful hand feeding is not used.

The grain components of the extruded horse feed are preferably ingredients such as grain sorghum, corn, wheat, barley or oats, and the fat and oil product components are preferably corn, oil, soybean oil, animal and vegetable hydrolyzed fat, animal fat or vegetable oil. The grain by-products are preferably comprised of any ingredient produced through the processing of grain or protein sources, for example, rice milled by-products, corn gluten feed, grain screenings or wheat middlings. The forage products preferably comprise ingredients such as dehydrated alfalfa meal. Fibrous or roughage products preferably comprise ingredients such as rice hulls, soy hulls, peanut hulls, oat straw and corncobs. The fibrous material is required in order to provide structural strength and integrity to the final product. The plant protein products are preferably selected from any of the following: cottonseed meal, sunflower meal, linseed meal, corn gluten meal or soybean meal. Finally, the nutritional supplements of the extruded horse feed are preferably fat soluble and water soluble vitamins such as vitamins A, D, E and B, riboflavin and niacin, and trace minerals such as calcium, phosphorus, copper, iron, manganese, iodine, zinc or cobalt. The salt component of the extruded horse feed is preferably sodium chloride. The micro-nutrient premix also include artificial colorants as needed.

In the preferred embodiment of the invention, the above-identified components are uniformly mixed and finely ground. Alternatively, the materials are ground separately prior to mixing. If desired, small amounts of vegetable oil can be added to soften the mixture for ease of working. The extrusion process is carried out in a conventional device. For example, the extruder may include a rotating screw which creates a high pressure on the material in the extruder. By passing steam through a annular jacket within the extruder housing, the temperature of the material and/or the moisture content of the material is raised.

After grinding the composition mixture, the mixture is introduced into the steam conditioning chamber of the extruder at about 180° to 320° Centigrade to raise the moisture content thereof. The damp mixture is then formed into relatively homogeneous feed particles by the operation of the rotating screw. The amount of heat applied is controlled by conventional techniques in a manner to obtain temperatures which prevent scorching of the product. The conditions of forming the feed particles are carefully controlled to produce particles having a preferred bulk density from 15 to 35 lb. per bushel. The particles are formed with a smooth texture having no rough surface projections. Preferably, the particles are formed into shapes having a length of approximately 1 to 3 inches, and are formed into shapes having rounded edges. The extrudate, after processing, forming and cutting, may be uniformly coated with an oil or the like to form the final product.

EXAMPLE 1

A mixture of 24.5 percent by weight grain products, 42.5 percent by weight milling by-products, 13.0 percent by weight forage products, 8.0 percent by weight roughage products, 7.0 percent by weight plant protein products, 1.5 percent by weight calcium carbonate, 1.0 percent by weight salt and 2.5 percent by weight micro-nutrient premix was formed. The mixture was introduced into a steam conditioner of an extruder wherein 21 percent moisture by weight was added to the mixture at about 195° Centigrade. The mixture was then passed through an extruder at about 280° Centigrade having an oval shaped die adapted to provide particles of 1 by 2 inches in length, obtaining therein a bulk weight of approximately 19 lbs. per bushel. The mixture was dried to about 7.0 percent moisture by weight. The typical partial nutritional profile for the feed produced in this manner is set forth below in Table II.

| Typical Partial Nutrition Profile | Amounts |
|---|---|
| Digestive Energy | 1150 Kcal/lb |
| Protein (minimum) | 12% |
| Crude Fat (maximum) | 2.9% |
| Crude Fiber (minimum) | 15.0% |
| Moisture (maximum) | 7.0% |

The above-identified mixture was fed for a period of sixty (60) days as the sole source of feed on an ad libitum basis. Horses to receive the expanded ration were changed to the diet gradually over a period of three (3) days. On the third day, the expanded ration was made available on an unrestricted basis. Over the next seven (7) days, the pounds of feed consumed daily continued to increase until the horses leveled off at approximately 30 lbs. of feed per head consumed daily.

As expected, the horses tended to eat small quantities each time they chose to eat, but there were several meal feedings throughout the day. One horse weighed in at 1040 lbs. live weight and had a final weight at the end of the 60 day period of 1080 lbs. This horse actively worked during this period but was kept in a dirt lot when not performing work. No ill effects were observed from feeding the expanded ration ad libitum. A second horse, a mare in foal during the last 90 days of the gestation period, has an initial weight of 1060 lbs. and a final live weight at the end of the test period of 1220 lbs. The mare gave birth to a healthy foal sometime after the feeding trial had been completed. Although the second horse was an aged mare, no problems were observed in consuming the expanded horse feed.

The present invention thus advantageously describes an extruded horse ration which can be fed to a horse in an unrestricted manner with no side effects. The described ration provides feed restriction without ingredient excess or chemical additives, but rather through the use of a low-to-medium energy, bulky, extruded feed which restricts overall nutrient intake due to actual physical constraints of the horse's stomach. Because of the low-to-medium energy content, the feed is primarily suited to the "pleasure" horse rather than the "performance" horse. Due to the feeding method, the chance of foundering the horse is remote because soluble carbohydrate levels never climb to intolerable levels in the bloodstream. Moreover, because the ration is self-fed on a continuous basis, the likelihood of colic is also remote.

Although the present invention has been described in detail, the same is by way of illustration and example only and is not to be taken by way of limitation, the spirit and scope thereof being limited only to the terms of the appended claims.

I claim:

1. A method for feeding a pleasure horse having low-to-medium energy requirements, comprising the steps of:
   extruding a horse ration into a plurality of substantially homogeneous feed particles having a bulk density between about 15–35 pounds per bushel, the horse ration having a composition consisting essentially of between about 15.0 and 28.1 percent by weight grain and fat and oil products, between about 20.0 and 30.0 percent by weight grain by-products, between about 8.0 and 20.0 percent by weight forage products, between about 8.0 and 20.0 percent by weight roughage products, between about 5.0 and 34.0 percent by weight plant protein products, between about 0.9 and 1.9 by weight calcium carbonate, between about 0.4 and 2.0 percent by weight salt and between about 1.7 and 5.0 percent by weight micro-nutrients; and
   free-choice feeding the extruded feed particles to the pleasure horse as substantially the sole source of nutrition excluding water without risk of digestive orders.

2. The method for feeding as described in claim 1 wherein the step of extruding the horse ration includes the steps of:

uniformly mixing the composition products to produce a uniformly-mixed composition;

grinding the uniformly-mixed composition to produce a ground mixed composition;

introducing the ground mixed composition into a steam conditioning chamber at about 180° to 230° Centigrade; and extruding the ground mixed composition into the plurality of substantially homogeneous feed particles.

3. The method for feeding as described in claim 2 wherein the step of extruding the horse ration further includes the step of:

cutting the feed particles into a predetermined shape.

* * * * *